Patented Apr. 28, 1942

2,280,792

UNITED STATES PATENT OFFICE 2,280,792

CYANOALKYL ETHERS OF ETHER ALCOHOLS

Herman A. Bruson, Philadelphia, Pa., assignor to The Resinous Products & Chemical Company, Philadelphia, Pa.

No Drawing. Application February 27, 1941, Serial No. 380,793

14 Claims. (Cl. 260—464)

This invention relates to β-cyanoalkyl ethers of monohydric alcohols which possess an aliphatic chain or cycle which is interrupted by at least one oxygen or sulfur atom. It also concerns a method for the preparation of these polyether nitriles.

It has been found that a monohydric alcohol possessing an aliphatic chain or cycle which is interrupted by one or more oxygen or sulfur atoms reacts in the presence of an alkaline condensing agent with acrylonitrile or α-methacrylonitrile to form a polyether nitrile. The reaction takes place advantageously at temperatures between about 10° C. and about 70° C. The initial reaction may, if desired, be controlled by external cooling and/or rate of mixing of the reactants. The presence of solvent is often helpful in controlling and completing the reaction. Suitable inert solvents include water, dioxane, benzene, and the like. When the reaction has been essentially completed, the reaction mixture is preferably neutralized before isolation of the reaction product by the use of an acid, such as hydrochloric, sulfuric, phosphoric, oxalic, etc. The product may be isolated by extraction with a solvent, such as ethylene dichloride or it may be distilled under reduced pressure.

As an alkaline condensing agent or catalyst, there may be used any strongly alkaline reagent, such as the oxides, hydroxides, alcoholates, or hydrides of the alkali or alkaline earth metals, the free metals themselves, or the strongly basic non-metallic hydroxides represented by the quaternary ammonium hydroxides, of which benzyl trimethyl ammonium hydroxide, dibenzyl dimethyl ammonium hydroxide and dodecyl benzyl dimethyl ammonium hydroxide are useful examples. The amount of alkaline catalyst which is employed varies from about 0.5% to 5% by weight of the amount of ether alcohol used.

Typical ether alcohols which may be used include aliphatic, arylaliphatic, alicyclic, and heterocyclic alcohols, of which the following are examples:

$CH_3OCH_2CH_2OH$
$C_2H_5OCH_2CH_2CH_2OH$
$CH_3OCH_2CH_2OCH_2CH_2OH$
$C_4H_9OCH_2CH_2OCH_2CH_2OH$
$C_5H_{11}OCH_2CH(CH_3)OCH(CH_3)CH_2OH$, ($C_5H_{11}$ being a tertiary group)
$C_8H_{17}OC_4H_8OC_4H_8OH$
$C_{18}H_{37}OCH_2CH_2OCH_2CH_2OH$
$C_2H_5OCH_2CH_2OCH_2CH_2OCH_2CH_2OCH_2CH_2OH$ or in general $C_mH_{2m}(OC_nH_{2n})_xOH$ $m$, $n$, and $x$ being integers.

$C_6H_5OCH_2CH_2OH$
$C_6H_5SCH_2CH_2OH$
$CH_3C_6H_4OCH_2CH_2OH$
$C_8H_{17}C_6H_4OCH_2CH_2OH$
$ClC_6H_4OCH_2CH_2OH$
$BrC_6H_4OCH_2CH_2OH$
p-ter-$C_4H_9C_6H_4OCH_2CH_2OH$
p-ter-$C_4H_9C_6H_4OCH_2CH_2OCH_2CH_2OH$
p-Br-$C_6H_4OCH_2CH_2OCH_2CH_2OH$
o,p-$Cl_2C_6H_3OCH_2CH_2OH$
$CH_3C_6H_4OCH_2CH_2CH_2OH$
$C_3H_7C_6H_4OCH_2CH(CH_3)OCH(CH_3)CH_2OH$
ter-$C_4H_9C_6H_4OC_2H_4OC_2H_4OC_2H_4OH$
iso-$C_8H_{17}C_6H_4OC_2H_4SC_2H_4OH$
$C_2H_5C_6H_4SC_2H_4SC_2H_4OH$
$C_{12}H_{25}C_6H_4OCH_2CH_2OCH_2CH_2OH$
$C_6H_5OC_4H_8OC_4H_8OH$
$C_6H_5C_6H_4OCH_2CH_2OH$
$C_6H_5C_6H_4OCH_2CH_2OCH_2CH_2OH$
$C_6H_{11}C_6H_4OCH_2CH_2OCH_2CH_2OH$, ($C_6H_{11}$ being cyclohexyl)
$C_{10}H_7OCH_2CH_2OH$, ($C_{10}H_7$ being naphthyl)
$CH_3C_{10}H_6OCH_2CH_2OCH_2CH_2OH$
$C_6H_{11}OCH_2CH_2OH$
$CH_3C_6H_{10}OCH_2CH_2OH$
$C_6H_5CH_2OCH_2CH_2OH$
$ClC_6H_4OCH_2CH_2OCH_2CH_2OH$
$BrC_6H_4OCH_2CH_2OH$
$BrCH_3C_6H_3OC_2H_4OC_2H_4OC_2H_4OH$

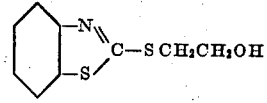

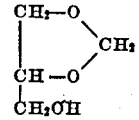

or

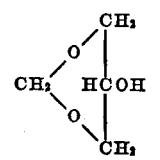

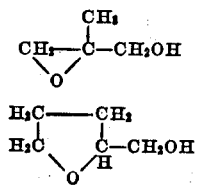

Most of these alcohols may be represented by the general formula $R(QC_nH_{2n})_xOH$ wherein Q represents oxygen or sulfur, R represents an aromatic, alicyclic, araliphatic, or aliphatic nucleus, n represents an integer from 2 to 4 inclusive and x represents a whole number. The group R may be substituted with any neutral group such as halogen, nitro, alkoxy, aryloxy, acyl, etc., which does not destroy the alkaline catalyst.

The nitriles with which the ether alcohols react are of the formula

wherein R' represents hydrogen or the methyl group. The compounds which result have in general the formula

wherein the symbols have the same significance as above.

*Example 1*

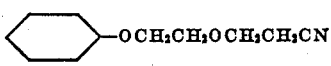

To a solution of 2 g. of powdered sodium methylate in 138 g. of β-phenoxyethanol there was added dropwise, during the course of one hour while the mixture was stirred and cooled to 25–50° C., 53 g. of acrylonitrile. The mixture was stirred for 18 hours at 25° C., then neutralized with dilute hydrochloric acid and extracted with ethylene dichloride. The extract was washed with water, dried and distilled under reduced pressure. The β-(phenoxyethoxy)propionitrile distilled over as a colorless oil at 160° C./1 mm. in a yield of 145 g.

*Example 2*

CH₃OCH₂CH₂OCH₂CH₂OCH₂CH₂CN

To a solution of 2 g. of powdered sodium methylate in 120 g. of diethylene glycol monomethel ether there was added dropwise during 45 minutes 53 g. of acrylonitrile while the mixture was stirred and cooled to 25–30° C. The mixture was then stirred for seven hours longer at 25° C., neutralized with dilute hydrochloric acid, and extracted with ethylene dichloride. The extract was distilled in vacuo after evaporating off the solvent. The β-(methoxyethoxyethoxy)propionitrile distilled at 145–150° C./10 mm. as a colorless liquid, yielding 110 g.

*Example 3*

Two grams of sodium oxide (Na₂O) was dissolved in 90 g. of glycol monoethyl ether by warming to 80° C. for several minutes. The mixture was cooled to 15° C. and stirred while 53 g. of acrylonitrile was added dropwise during 45 minutes. The mixture was then stirred for eight hours at 25° C., neutralized with dilute hydrochloric acid, filtered, and the filtrate extracted with 150 cc. of ethylene dichloride. The filtered extract was then distilled, eventually under reduced pressure. The β-cyano-ethoxy-diethyl ether distilled at 128° C./26 mm. as a colorless liquid in a yield of 75%.

*Example 4*

To a solution of 2 g. of sodium methylate in 162 g. of diethylene glycol monobutyl ether there was added dropwise during 35 minutes 53 g. of acrylonitrile while the mixture was stirred and cooled to 10–15° C. The mixture was then stirred for eight hours at 25° C., poured into 200 cc. of water, and the oil layer separated, washed and distilled under reduced pressure. The β-(n-butoxyethoxyethoxy)propionitrile distilled over at 165–175° C./10 mm. as a colorless oil in 70% yield.

*Example 5*

To a solution of 2 g. of powdered sodium ethylate in 76 g. of glycol monomethyl ether there was added dropwise during one hour 53 g. of acrylonitrile while the mixture was stirred and cooled to 25° C. The mixture was then stirred for five hours at room temperature, neutralized with dilute hydrochloric acid, and extracted with 100 cc. of ethylene dichloride. The extract was then distilled, eventually under reduced pressure. The β-(methoxyethoxy)propionitrile distilled over at 126° C./26 mm. as a colorless liquid in a yield of 96 g.

*Example 6*

Three grams of sodium methylate was dissolved in 250 g. of p-(α,α,γ,γ-tetramethylbutyl)-phenoxyethanol by heating for one-half hour at 70–80° C. The solution was cooled to 30° C. and stirred while 53 g. of acrylonitrile was added dropwise during one-half hour while the temperature rose spontaneously to 55° C. Cooling was then applied and the mixture was stirred for 24 hours at 25–30° C. It was then acidified with dilute hydrochloric acid, washed several times with water, dried, and distilled under reduced pressure. A light fraction of 20 g. was taken off below 196° C. at 1 mm. pressure and discarded. The p-ter-octylphenoxyethoxypropionitrile distilled over at 196–206° C./1 mm. as an almost colorless thick oil in a yield of 271 g. or 89.4% of theoretical. The product crystallized on standing. After recrystallization from cold petroleum ether, it melted at 45–46° C.

*Example 7*

To 186.5 g. of an aqueous 33% solution of condensation product of nine mols of ethylene oxide and one mol of p-ter-octyl-ortho-cresol having the formula

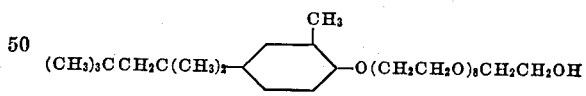

there was added 4 g. of 50% sodium hydroxide solution and 5.3 g. of acrylonitrile. The mixture was stirred at 25° C. for 24 hours and the alkali neutralized with dilute hydrochloric acid. The clear solution obtained was concentrated under reduced pressure on a steam bath until no more water came over. The residual syrup was then filtered hot by suction to remove sodium chloride. The product obtained was an amber-colored water-soluble syrup containing 1.93% nitrogen by analysis, corresponding to the formula

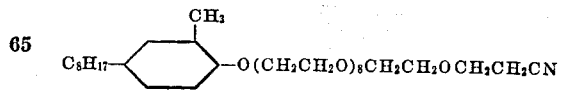

The theoretical is 2.09% nitrogen.

It shows capillary-active, soap-like properties.

*Example 8*

To a cold mixture of 62.3 g. of diethylene glycol chlorohydrin and 2 g. of 50% sodium hydroxide solution there was added dropwise, while the mixture was stirred and cooled to 20–25° C., 26.5 g. of acrylonitrile during a period of one-half hour. The mixture was then stirred for two hours without any external cooling, during which time the temperature rose spontaneously to 35° C. The product was then neutralized with dilute hydrochloric acid mixed with 10 cc. of water and extracted with 100 cc. of ethylene dichloride. The extract was then distilled. The 2-chloroethoxy-2-cyanoethoxy-ethane-1,2 came over at 133–137° C./1 mm. as a colorless oil. Yield 60 g.

$N^{25}D$ 1.4549; sp. gr. at 25° C. 1.1299

It is soluble in water, acetone, or benzene.

In place of diethylene glycol chlorohydrin there may be substituted mol for mol triethylene glycol chloro- or bromo-hydrin to form the corresponding chloro- or bromo-ethoxyethoxyethoxy propionitriles or, when acrylonitrile is replaced with α-methacrylonitrile, 1-methyl propionitriles. Similarly, there may be used tetraethylene glycol halohydrins, or higher polyethylene halohydrins, or in general any polyalkylene glycol halohydrin. There may likewise be reacted halogen-substituted phenyl ethers of the glycols. The haloether nitriles which are thus obtainable are of particular interest. They may be represented by the formula $$XR(OC_nH_{2n})_xOH$$

wherein X is a halogen, R is a hydrocarbon group, n is a whole number from 2 to 4 inclusive and x is an integer. The group R may be an alkylene group or an aryl group. In the latter case it may be further substituted with neutral groups.

*Example 9*

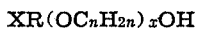
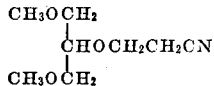

To a solution of 2 g. of powdered sodium methylate in 120 g. of glyceryl-1,3-dimethyl ether there was added during 40 minutes 53 g. of acrylonitrile while the mixture was stirred and the temperature held between 25° and 35° C. The mixture was then stirred for six hours longer, diluted with 25 cc. of water, neutralized with hydrochloric acid and shaken with 100 cc. of ethylene dichloride. The water layer was separated and the ethylene dichloride layer distilled. The 1,3-di-methoxy-2-cyano-ethoxy-propane distilled over at 110° C./0.5 mm. as a colorless oil. The yield was 139 g. Upon redistillation at 10 mm., the oil boiled at 129° C.

*Example 10*

To a solution of 4 g. of aqueous 40% trimethylbenzyl ammonium hydroxide in 152 g. of glycol monobenzyl ether there was added gradually during 30 minutes 53 g. of acrylonitrile while the reaction mixture was stirred and cooled to 25–30° C. The mixture was then stirred an additional four hours at 25–30° C., acidified with dilute hydrochloric acid, washed with 25 cc. of water and the oil layer separated and distilled in vacuo. The desired product $$C_6H_5CH_2OCH_2CH_2OCH_2CH_2CN$$

distilled over at 146° C./1 mm. as a colorless oil in a yield of 156 g. $N^{25}D$ 1.5043; sp. gr. at 25° C. 1.0610.

*Example 11*

To a solution consisting of 10 g. of aqueous 40% trimethylbenzyl ammonium hydroxide in 118 g. of pure ethylene glycol monobutyl ether (sold under the trade name "Butyl Cellosolve") there was added dropwise 53 g. of acrylonitrile while the reaction mixture was stirred and the temperature maintained at 30–45° C. by external cooling. The mixture was then stirred for an hour longer at room temperature. Water (25 cc.) was added and sufficient 10% hydrochloric acid to give an acid reaction to litmus. The oil layer was separated and distilled in vacuo. The butoxyethoxy propionitrile $$C_4H_9OCH_2CH_2OCH_2CH_2CN$$

came over at 130° C./10 mm. as a colorless oil in a yield of 134 g.

*Example 12*

A mixture of 102 g. of tetrahydrofurfuryl alcohol and 2 g. of sodium oxide was heated 10 minutes at 90° C. and cooled to 10° C. 53 g. of acrylonitrile was added dropwise during one hour with constant stirring and external cooling so that the temperature did not exceed 15° C. It was then stirred for six hours at 15–25° C., dissolved in 200 cc. of water, and filtered. The filtrate was salted out with 50 g. of sodium chloride and extracted with ether. The ether extract was then fractionated, first to remove the ether and then to purify the product in vacuo. The product, tetrahydrofurfuryloxy propionitrile,

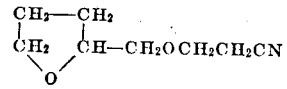

distilled at 130–135° C./10 mm. as a colorless oil in a yield of 71 g. or 44.5%.

*Example 13*

To a rapidly stirred mixture of 104 g. of p-ter-amyl phenoxyethanol and 3 g. of aqueous 38% trimethyl benzyl ammonium hydroxide there was added dropwise 26.5 g. of acrylonitrile while the mixture was cooled to 25–35° C. The mixture was then stirred for 18 hours at room temperature (25° C.) and acidified with dilute hydrochloric acid. The oil was taken up in ethylene dichloride, washed thoroughly with water and the solvent removed by evaporation. The residual oil upon distillation at 1–2 mm. gave a yield of 88 g. boiling at 178° C., consisting of the cyanoethyl ether having the formula

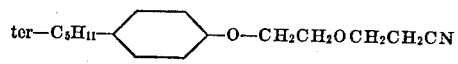

*Example 14*

To a rapidly stirred mixture of 82 g. of p-chlorophenoxypropanol-2 and 3 g. of aqueous 38% trimethyl benzyl ammonium hydroxide solution there was added dropwise 23.3 g. of acrylonitrile during 35 minutes while the temperature was held between 25° and 40° C. The mixture was then stirred two hours longer at 25–30° C., acidified with dilute hydrochloric acid and the oil layer thoroughly washed with warm water. The oil was distilled in vacuo to yield 76 g. of colorless oil boiling at 170° C./1 mm., having the formula

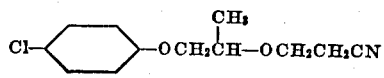

The products are useful as insecticides, as wetting and emulsifying agents, and as intermediates for pharmaceuticals, resins, plasticizers, etc. They yield amines on reduction and amides, esters, acids, and salts on hydrolysis.

I claim:

1. A method for preparing β-cyanoalkyl polyethers which comprises reacting a monohydric ether alcohol, the ether chain of which is saturated, with a member of the group consisting of acrylonitrile and α-methacrylonitrile in the presence of an alkaline condensing agent.

2. A method of preparing β-cyanoalkyl polyethers which comprises reacting in the presence of an alkaline condensing agent a nitrile selected from the class consisting of acrylonitrile and α-methacrylonitrile with a monohydric alcohol having a saturated chain which is interrupted at least once by at least one member of the group consisting of oxygen and sulfur atoms.

3. A method of preparing β-cyanoethyl polyethers which comprises reacting between about 10° C. and about 70° C. in the presence of an alkaline condensing agent acrylonitrile with a monohydric alcohol having a saturated chain which is interrupted at least once by at least one member of the group consisting of oxygen and sulfur atoms.

4. A method of preparing β-cyano-β-methyl ethyl polyethers which comprises reacting between about 10° C. and about 70° C. in the presence of an alkaline condensing agent α-methacryonitrile with a monohydric alcohol having a saturated chain which is interrupted at least once by at least one member of the group consisting of oxygen and sulfur atoms.

5. A method of preparing β-cyanoethyl polyethers which comprises reacting between about 10° C. and about 70° C. in the presence of an alkaline condensing agent acrylonitrile with an ether alcohol of the formula $$XR(OC_nH_{2n})_xOH$$

wherein X represents a halogen, R represents a hydrocarbon group, n represents a whole number having a value from 2 to 4 inclusive, and x represents an integer.

6. A method of preparing β-cyanoethyl polyethers which comprises reacting between about 10° C. and about 70° C. in the presence of an alkaline condensing agent acrylonitriline with an ether alcohol of the formula $$XR(OC_nH_{2n})_xOH$$

wherein X represents a halogen, R represents an alkylene group, n represents a whole number having a value from 2 to 4 inclusive and x represents an integer.

7. A method of preparing β-cyanoethyl polyethers which comprises reacting between about 10° C. and about 70° C. in the presence of an alkaline condensing agent acrylonitrile with an ether alcohol of the formula $$X\text{-aryl}(OC_nH_{2n})_xOH$$

wherein X represents a halogen, n represents a whole number having a value from 2 to 4 inclusive, and x represents an integer.

8. A method of preparing β-cyanoethyl polyethers which comprises reacting between about 10° C. and about 70° C. in the presence of an alkaline condensing agent acrylonitrile with an ether alcohol of the formula $$\text{Cl-alkylene}-OC_2H_4OCH_2CH_2OH$$

9. A method of preparing β-cyanoethyl polyethers which comprises reacting between about 10° C. and about 70° C. in the presence of an alkaline condensing agent acrylonitrile with an ether alcohol of the formula $$\text{Cl-alkylene-}OC_2H_4OH$$

10. As new compositions of matter, nitriles of the formula $$XR(OC_nH_{2n})_xOC_2H_4CN$$

wherein X represents a halogen, R represents a hydrocarbon group, n represents a whole number having a value from 2 to 4 inclusive, and x represents an integer.

11. As new compositions of matter, nitriles of the formula $$X\text{-alkylene}(OC_nH_{2n})_xOC_2H_4CN$$

wherein X represents a halogen, n represents a whole number having a value from 2 to 4 inclusive, and x represents an integer.

12. As new compositions of matter, nitriles of the formula $$X\text{-aryl}(OC_nH_{2n})_xOC_2H_4CN$$

wherein X represents a halogen, n represents a whole number having a value from 2 to 4 inclusive, and x represents an integer.

13. As a new composition of matter, a nitrile of the formula $$\text{Cl-alkylene-}OC_2H_4OC_2H_4OC_2H_4CN$$

14. As a new composition of matter, a nitrile of the formula $$\text{Cl-alkylene-}OC_2H_4OC_2H_4CN$$

HERMAN A. BRUSON.

CERTIFICATE OF CORRECTION.

Patent No. 2,280,792. April 28, 1942.

HERMAN A. BRUSON.

It is hereby certified that error appears in the printed specification of the above numbered patent requiring correction as follows: Page 4, first column, line 47, claim 6, for "acrylonitriline" read --acrylonitrile--; and that the said Letters Patent should be read with this correction therein that the same may conform to the record of the case in the Patent Office.

Signed and sealed this 14th day of July, A. D. 1942.

(Seal)

Henry Van Arsdale,
Acting Commissioner of Patents.